Nov. 18, 1924. 1,516,432

P. J. HILLIARD

DIP PIPE CONSTRUCTION FOR THE HYDRAULIC MAIN OF A GAS PLANT

Filed March 18, 1924

Inventor
Peter J. Hilliard
By Harry Cohen
Attorney

Patented Nov. 18, 1924.

1,516,432

UNITED STATES PATENT OFFICE.

PETER J. HILLIARD, OF CANANDAIGUA, NEW YORK.

DIP-PIPE CONSTRUCTION FOR THE HYDRAULIC MAIN OF A GAS PLANT.

Application filed March 18, 1924. Serial No. 700,075.

*To all whom it may concern:*

Be it known that I, PETER J. HILLIARD, a citizen of the United States, residing at Canandaigua, in the county of Ontario and State of New York, have invented certain new and useful Improvements in Dip-Pipe Constructions for the Hydraulic Main of a Gas Plant, of which the following is a specification.

This invention relates to dip pipes for the hydraulic mains of gas plants and has for its main object the provision of a dip pipe having means whereby the dip pipe may be adjusted so as to seal properly at all times.

In the ordinary modern gas plant, a plurality or dip pipes enter a common hydraulic main through which the gas is exhausted from the retorts. When the dip pipes are first installed, a proper seal is maintained at the outlet of each individual dip pipe, but after being used for some time the dip pipes become tipped or inclined and frequently the seal of one or more dip pipes is broken. There are, of course, numerous disadvantages brought about by improper sealing of the dip pipes in the hydraulic main, as are well known to those skilled in the art, and chief among these disadvantages are the loss of gas and back pressure on the retorts during charging caused by cutting off the exhauster when a particular seal is improperly made.

My invention obviates all the disadvantages due to improper sealing and the means for causing proper sealing is the subject matter of the present application and will be described in detail and pointed out in the claims appended hereto.

In the drawings:—

Figure 1:
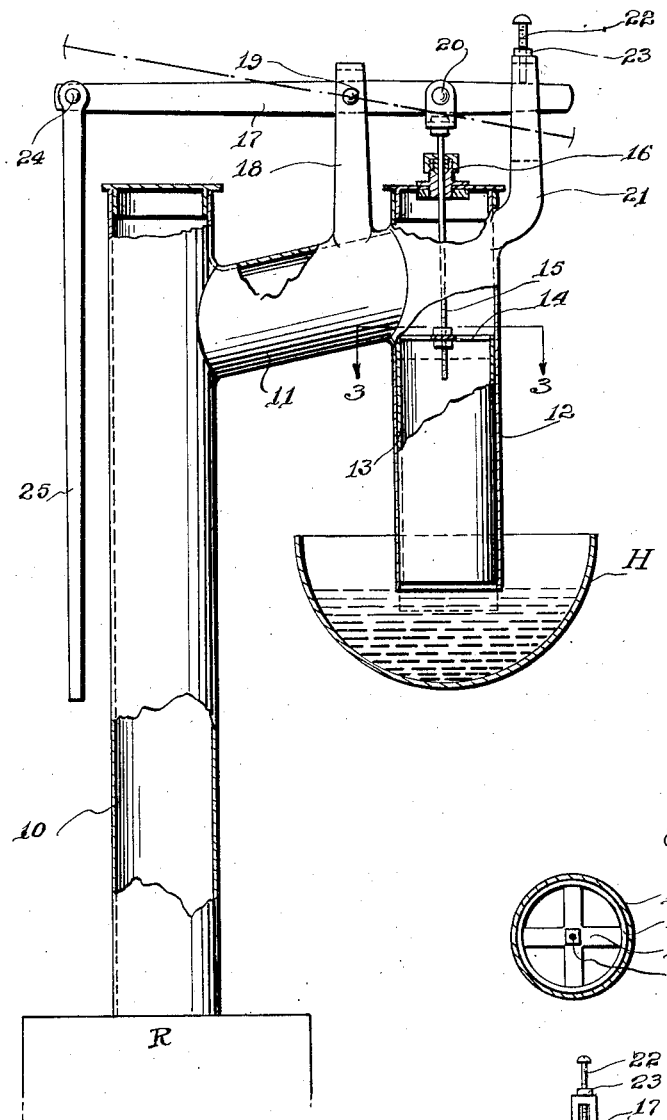
Fig. 1 is a view partly in elevation and partly in section of my novel dip pipe shown in its relation to the retort and the hydraulic main.
Figure 3:
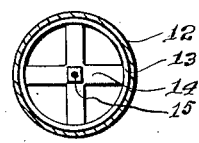
Fig. 3 is a sectional view on the line 3—3 of Fig. 1.
Figure 2:
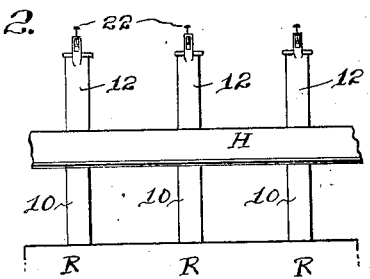
Fig. 2 is a view in diagrammatic elevation of a plurality of dip pipes.

Referring to the drawings in detail, the reference characters R and H designate the retort and the hydraulic main connected together as shown. The connecting means comprises a stand pipe 10, a bridge pipe 11 and a dip pipe 12 and it will be observed from an inspection of Fig. 2, which is a conventional or diagrammatic showing, that a plurality of dip pipes 12 enter a common hydraulic main H, and as shown by Fig. 1, the end of the dip pipe 12 is designed to normally effect a seal in the hydraulic main. As already stated, when the pipes are first installed this seal operates properly but after a period of use the seal does not operate perfectly. To permit of proper sealing and adjusting of the seal for any particular dip pipe in the hydraulic main, I have provided an internal sliding sleeve 13 in each dip pipe 12 and I have provided means for adjusting this sleeve 13 longitudinally of the dip pipe.

Figure 4:
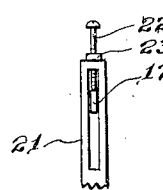
Fig. 4 is a detail elevational view of the adjustable stop device.

The sleeve 13 is, by preference, a hollow cylinder in proper sliding contact with the internal wall of the dip pipe, as clearly shown by the drawings. The upper end of the sliding sleeve or seal 13 has a spider 14 associated therewith and connected to this spider 14 is a rod 15 which passes through a stuffing-box 16 at the top of the dip pipe. To operate the rod 15 and thereby move the sliding seal 13, I have provided a lever 17 pivotally supported intermediate its ends by the supporting upright 18 at 19 and connected pivotally to the rod or stem 15 at 20. I have provided a guide for one end of the lever 17, this guide being designated by the numeral 21 and comprising an upright channeled member, as shown more clearly by Fig. 4, and an adjustable stop device comprising a screw 22 passes through the top of the guide upright 21 and is received between the sides of this channeled member. A lock nut 23 is provided to hold the adjustable stop 22 in adjusted position. To the other end of the lever 17 at 24 is pivotally connected an operating rod 25 and it is obvious that a cord or other means may be substituted for this rod.

From the foregoing description it is apparent that I have provided a simple means for perfecting seals in dip pipes. When any particular dip pipe makes an improper or defective seal with the hydraulic main, it is necessary only to operate the lever 17 to move the sliding sleeve or seal 13 into proper sealing position, and by adjusting the screw or stop device 22, movement of the sleeve out of sealing position is prevented, but when it is desired to move the sleeve out of sealing position, the adjusting screw may be moved and the lever 17 operated to effect upward movement of the sleeve 13, as is obvious.

While I have shown and described the preferred embodiment of the invention, it will be understood that certain changes may be made and will suggest themselves to those skilled in the art to which this invention relates but all such changes as come within the scope of the appended claims are to be considered as part of my invention.

Having thus described my invention, what I claim and desire to secure by Letters Patent of the United States is:

1. In combination with the hydraulic main of a gas plant, a stand pipe, a dip pipe, a bridge pipe therebetween, a sliding seal in said dip pipe, a rod for operating said sliding seal, an upright support mounted on said bridge pipe, a lever pivoted intermediate its ends to said upright support, a guide for one end of said lever, a pivotal connection between said lever and said rod located between the pivotal connection of the lever on the upright support and the said guide for the end of the lever, and an adjustable stop device for the lever associated with said guide.

2. In combination with the hydraulic main of a gas plant, a dip pipe, a sliding seal for said dip pipe, a rod for operating said sliding seal, a lever for operating said rod, a guide for one end of said lever comprising a channeled arm support mounted on said dip pipe, and an adjustable stop device for the lever associated with said guide.

In testimony whereof I hereunto affix my signature.

PETER J. HILLIARD.